US010979848B1

(12) United States Patent
Palappetty et al.

(10) Patent No.: US 10,979,848 B1
(45) Date of Patent: Apr. 13, 2021

(54) METHOD FOR IDENTIFYING A DEVICE USING ATTRIBUTES AND LOCATION SIGNATURES FROM THE DEVICE

(71) Applicant: Near Pte. Ltd., Singapore (SG)

(72) Inventors: Hari Palappetty, Bangalore (IN); Sumanth N, Bangalore (IN)

(73) Assignee: Near Pte. Ltd., Singapore (SG)

( * ) Notice: Subject to any disclaimer, the term of this patent is extended or adjusted under 35 U.S.C. 154(b) by 0 days.

(21) Appl. No.: 17/142,144

(22) Filed: Jan. 5, 2021

(51) Int. Cl.
| G06F 15/173 | (2006.01) |
| H04W 4/02 | (2018.01) |
| G06N 20/00 | (2019.01) |
| H04L 9/32 | (2006.01) |
| H04W 64/00 | (2009.01) |

(52) U.S. Cl.
CPC .............. *H04W 4/02* (2013.01); *G06N 20/00* (2019.01); *H04L 9/3247* (2013.01); *H04W 64/003* (2013.01)

(58) Field of Classification Search
CPC ..... H04W 4/02; H04W 64/003; H04W 64/00; H04W 4/029; G06N 20/00; G06N 29/00; H04L 9/3247; H04L 43/08; H04L 67/306
USPC ......................................................... 709/226
See application file for complete search history.

(56) References Cited

U.S. PATENT DOCUMENTS

| 8,438,184 B1* | 5/2013 | Wang ..................... H04L 67/306 707/780 |
| 9,622,036 B1* | 4/2017 | Jintaseranee ......... H04L 67/306 |
| 2008/0113672 A1* | 5/2008 | Karr ....................... G01S 5/0252 455/456.1 |
| 2008/0255758 A1* | 10/2008 | Graham ................... G08G 1/20 701/469 |
| 2011/0035284 A1* | 2/2011 | Moshfeghi ............ H04W 4/027 705/14.58 |
| 2012/0184292 A1* | 7/2012 | Lin ...................... H04W 64/003 455/456.1 |
| 2012/0185458 A1* | 7/2012 | Liu ......................... G06F 16/29 707/709 |
| 2012/0190380 A1* | 7/2012 | Dupray ................... G01S 5/021 455/456.1 |
| 2013/0152160 A1* | 6/2013 | Smith ..................... H04L 63/20 726/1 |
| 2013/0267255 A1* | 10/2013 | Liu ....................... H04W 4/029 455/456.3 |

(Continued)

Primary Examiner — Mahendra R Patel

(57) ABSTRACT

A method for identifying an entity device using device signature of the entity device and location signature of a location. The method includes generating device signature for the entity device based on device and connection attributes and user agent strings obtained from independently controlled data sources, generating location signature for the location based on latitude-longitude pair, shape or size of the location, and connection attributes of devices connecting from the location, receiving location data streams from the entity device, generating a cohort of device signatures for the location, generating indexed data stream for the location using combination of the location signature and the cohort of device signatures, building set of rules or machine learning model based on indexed data stream, assigning unique generated identifier for entity device, and identifying, the entity device using the unique generated identifier from selected data stream that does not include device identifier of the entity device.

20 Claims, 7 Drawing Sheets

(56) References Cited

U.S. PATENT DOCUMENTS

| | | | |
|---|---|---|---|
| 2015/0345969 A1* | 12/2015 | McGavran | G06Q 30/0205 |
| | | | 701/409 |
| 2015/0379568 A1* | 12/2015 | Balasubramanian | ........................ |
| | | | G10L 13/033 |
| | | | 705/14.53 |
| 2016/0012240 A1* | 1/2016 | Smith | G06F 21/606 |
| | | | 726/1 |
| 2016/0055244 A1* | 2/2016 | Wang | H04L 67/1097 |
| | | | 707/770 |
| 2017/0353477 A1* | 12/2017 | Faigon | G06F 21/6209 |
| 2020/0107163 A1* | 4/2020 | Li | G06F 16/29 |
| 2020/0112835 A1* | 4/2020 | Li | G06Q 30/0261 |
| 2020/0163044 A1* | 5/2020 | Bapat | H04W 64/006 |
| 2020/0372006 A1* | 11/2020 | Boelderl-Ermel | G06F 16/27 |

\* cited by examiner

FIG. 3

GEO HASH TABLE REPRESENTING HOME LOCATION AND WORK LOCATION

GCOVJ1ZS – 0.9991
GFCDJDAH – 0.9985
GDSVSD – 0.9962

DEVICE ATTRIBUTES, CONNECTION ATTRIBUTES AND USER AGENT STRINGS

WEB DATA, SMART MOBILE APPLICATION DATA, SENSOR DATA, LOCATION DATA STREAMS

→ DATA AUGMENTATION MODULE 203

WI-FI DATA →

→ GENERATED IDENTIFIER MODULE 214

→ GENERATED IDENTIFIER SCORING MODULE 302

ID1 – 0.9991
ID2 – 0.9985
ID3 – 0.9973
ID4 – 0.9962

IDN-2 – 0.0231
IDN-1 – 0.121
IDN – 0.0231

300

GENERATING AT LEAST ONE DEVICE SIGNATURE FOR THE ENTITY DEVICE BASED ON A PLURALITY OF DEVICE ATTRIBUTES, CONNECTION ATTRIBUTES AND USER AGENT STRINGS OBTAINED FROM INDEPENDENTLY CONTROLLED DATA SOURCES
502

GENERATING AT LEAST ONE LOCATION SIGNATURE FOR THE LOCATION BASED ON A AT LEAST ONE OF LATITUDE OR LONGITUDE PAIR OR ALTITUDE, A SHAPE OR SIZE OF THE LOCATION, AND CONNECTION ATTRIBUTES OF DEVICES CONNECTING FROM THE LOCATION
504

RECEIVING, IN REAL TIME, A PLURALITY OF LOCATION DATA STREAMS FROM THE ENTITY DEVICE, WHEREIN THE PLURALITY OF LOCATION DATA STREAMS COMPRISES A TIMESTAMP DATA AND AT LEAST ONE LOCATION ATTRIBUTE
506

GENERATING A COHORT OF DEVICE SIGNATURES FOR THE LOCATION
508

GENERATING AN INDEXED DATA STREAM FOR THE LOCATION USING A COMBINATION OF THE AT LEAST ONE LOCATION SIGNATURE AND THE COHORT OF DEVICE SIGNATURES FOR THE LOCATION
510

METHOD FOR IDENTIFYING A DEVICE USING ATTRIBUTES AND LOCATION SIGNATURES FROM THE DEVICE

BACKGROUND

Technical Field

The embodiments herein relate to uniquely identifying a device, and more specifically to an automatic system and method for identifying a device using attributes and location signatures from the device.

Description of the Related Art

With ever increasing digitization and usage of smart mobile applications, users are generating a large amount of internet traffic data. The internet traffic data may be an indicator of location of the users at a given time frame. A variety of different events associated with the users are encoded in a number of data formats, recorded and transmitted in a variety of data streams depending on the nature of the device. The smart mobile applications, when engaged with a user, generate an event that produces data streams with device identifiers that are an integral part of smartphone ecosystem and smart mobile applications economy.

Traditionally, identification of a device relies heavily on a mobile advertising identifier (MAID) that can be identified with high accuracy. Due to increasing concerns of protecting privacy, the users are allowed to control sharing of the MAID associated with the users. In such a case where the MAID is unavailable, a problem of uniquely identifying a device arises. Hence it becomes difficult to meaningfully engage with the users. Even though available data points on human activity are increasing in size as the users use a greater number of devices (smartphone, smart watches, television (TV), personal computer (PC)), integrating this disparate data remains a fundamental issue. Further. There is a use of multiple identifiers for a single user across multiple data sources. Approaches for linking multiple identifiers vary across vendors and different enterprises. The approaches fuse data available across multiple sources for realizing common knowledge about the users but the problem occurs due to availability of partial data and the mere size of data, which is in several gigabytes, being received on a daily basis. Further, much of the data obtained in the data streams is either partial or incorrect. This partial data is referred to as data exhaust or exhaust data, which is the trail of data left by the activities of internet or other computer system entities during their online activity, behavior and transactions. This category of unconventional data includes geospatial, network, and time-series data which may be useful for predictive purposes.

Further, the data streams are from independently controlled sources. The independently controlled sources are sources of the data stream that control a variety of aspects such as the attributes which are collected, frequency and means of data being collected, format of data, format of populating the data stream and types of identifier used.

Accordingly, there remains a need for a system and method for generating a unique identifier for the devices and identifying the devices in absence of the MAID.

SUMMARY

In view of the foregoing, an embodiment herein provides a method identifying an entity device using a device signature of the entity device and a location signature of a location. The method includes (a) generating at least one device signature for the entity device based on a plurality of device attributes, connection attributes and user agent strings obtained from independently controlled data sources; (b) generating at least one location signature for the location based on a at least one of latitude-longitude pair and altitude, a shape or size of the location, and connection attributes of devices connecting from the location; (c) receiving, a plurality of location data streams from the entity device, wherein the plurality of location data streams comprises a timestamp data and at least one location attribute; (d) generating a cohort of device signatures for the location; (e) generating an indexed data stream for the location using a combination of the at least one location signature and the cohort of device signatures for the location; (f) building at least one of a set of rules or a machine learning model based on the indexed data stream for the location; (g) assigning a unique generated identifier for the entity device based on at least one of the set of rules or the machine learning model; and (h) identifying, the entity device using the unique generated identifier from a selected data stream associated with the entity device, wherein the selected data stream comprises a device information selected from the plurality of device attributes, connection attributes and user agent strings, and a location information of the entity device at a time, wherein the selected data stream does not include a device identifier of the entity device.

In some embodiments, the location signature is determined from an annotated point of interest database.

In some embodiments, a dynamic score of confidence is assigned to the unique generated identifier based on at least one of the set of rules or the machine learning model.

In some embodiments, the method further includes validating the plurality of data streams by comparing at least one of an advertisement identifier, a cookie identifier or a social media identifier with previously observed identifiers.

In some embodiments, the dynamic score of confidence is validated by correlating a plurality of attributes of the at least one device signature and at least one location signature with a historical labelled data set.

In some embodiments, the method further includes determining at least one attribute of the location by mapping a data stream associated with the location to the entity device.

In some embodiments, the plurality of attributes comprises device attributes and attributes of a user associated with the entity device.

In some embodiments, a plurality of pre-computed weights is assigned to the independently controlled data sources to increase accuracy of the unique generated identifier for the entity device.

In another aspect, there is provided a system for identifying an entity device using a device signature of the entity device and a location signature of a location. The system includes a processor and a memory that stores a set of instructions, which when executed by the processor, causes to perform: (a) generating at least one device signature for the entity device based on a plurality of device attributes, connection attributes and user agent strings obtained from independently controlled data sources; (b) generating at least one location signature for the location based on a at least one of latitude-longitude pair and altitude, a shape or size of the location, and connection attributes of devices connecting from the location; (c) receiving, a plurality of location data streams from the entity device, wherein the plurality of location data streams comprises a timestamp data and at least one location attribute; (d) generating a cohort of device signatures for the location; (e) generating an indexed data stream for the location using a combination of the at least one location signature and the cohort of device signatures for the location; (f) building at least one of a set of rules or a machine learning model based on the indexed data stream for the location; (g) assigning a unique generated identifier for the entity device based on at least one of the set of rules or the machine learning model; and (h) identifying, the entity device using the unique generated identifier from a selected data stream associated with the entity device, wherein the selected data stream comprises a device information selected from the plurality of device attributes, connection attributes and user agent strings, and a location information of the entity device at a time, wherein the selected data stream does not include a device identifier of the entity device.

In some embodiments, the location signature is determined from an annotated point of interest database.

In some embodiments, a dynamic score of confidence is assigned to the unique generated identifier based on at least one of the set of rules or the machine learning model.

In some embodiments, the processor further validates the plurality of data streams by comparing at least one of an advertisement identifier, a cookie identifier or a social media identifier with previously observed identifiers.

In some embodiments, the dynamic score of confidence is validated by correlating a plurality of attributes of the at least one device signature and at least one location signature with a historical labelled data set.

In some embodiments, the processor further determines at least one attribute of the location by mapping a data stream associated with the location to the entity device.

In some embodiments, the plurality of attributes comprises device attributes and attributes of a user associated with the entity device.

In some embodiments, a plurality of pre-computed weights is assigned to the independently controlled data sources to increase accuracy of the unique generated identifier for the entity device.

In another aspect, there is provided one or more non-transitory computer-readable storage mediums storing the one or more sequences of instructions, which when executed by the one or more processors, causes identifying an entity device using a device signature of the entity device and a location signature of a location by (a) generating at least one device signature for the entity device based on a plurality of device attributes, connection attributes and user agent strings obtained from independently controlled data sources; (b) generating at least one location signature for the location based on a at least one of latitude-longitude pair and altitude, a shape or size of the location, and connection attributes of devices connecting from the location; (c) receiving, a plurality of location data streams from the entity device, wherein the plurality of location data streams comprises a timestamp data and at least one location attribute; (d) generating a cohort of device signatures for the location; (e) generating an indexed data stream for the location using a combination of the at least one location signature and the cohort of device signatures for the location; (f) building at least one of a set of rules or a machine learning model based on the indexed data stream for the location; (g) assigning a unique generated identifier for the entity device based on at least one of the set of rules or the machine learning model; and (h) identifying, the entity device using the unique generated identifier from a selected data stream associated with the entity device, wherein the selected data stream comprises a device information selected from the plurality of device attributes, connection attributes and user agent strings, and a location information of the entity device at a time, wherein the selected data stream does not include a device identifier of the entity device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3 is a schematic illustration of a data augmentation module of FIG. 2 for assigning a dynamic confidence score to a unique generated identifier according to some embodiments herein;

FIGS. 5A and 5B are flow diagrams of a method for identifying the entity device using the device signature of the entity device and the location signature of the location according to some embodiments herein.

DETAILED DESCRIPTION OF PREFERRED EMBODIMENTS

Figure 1:
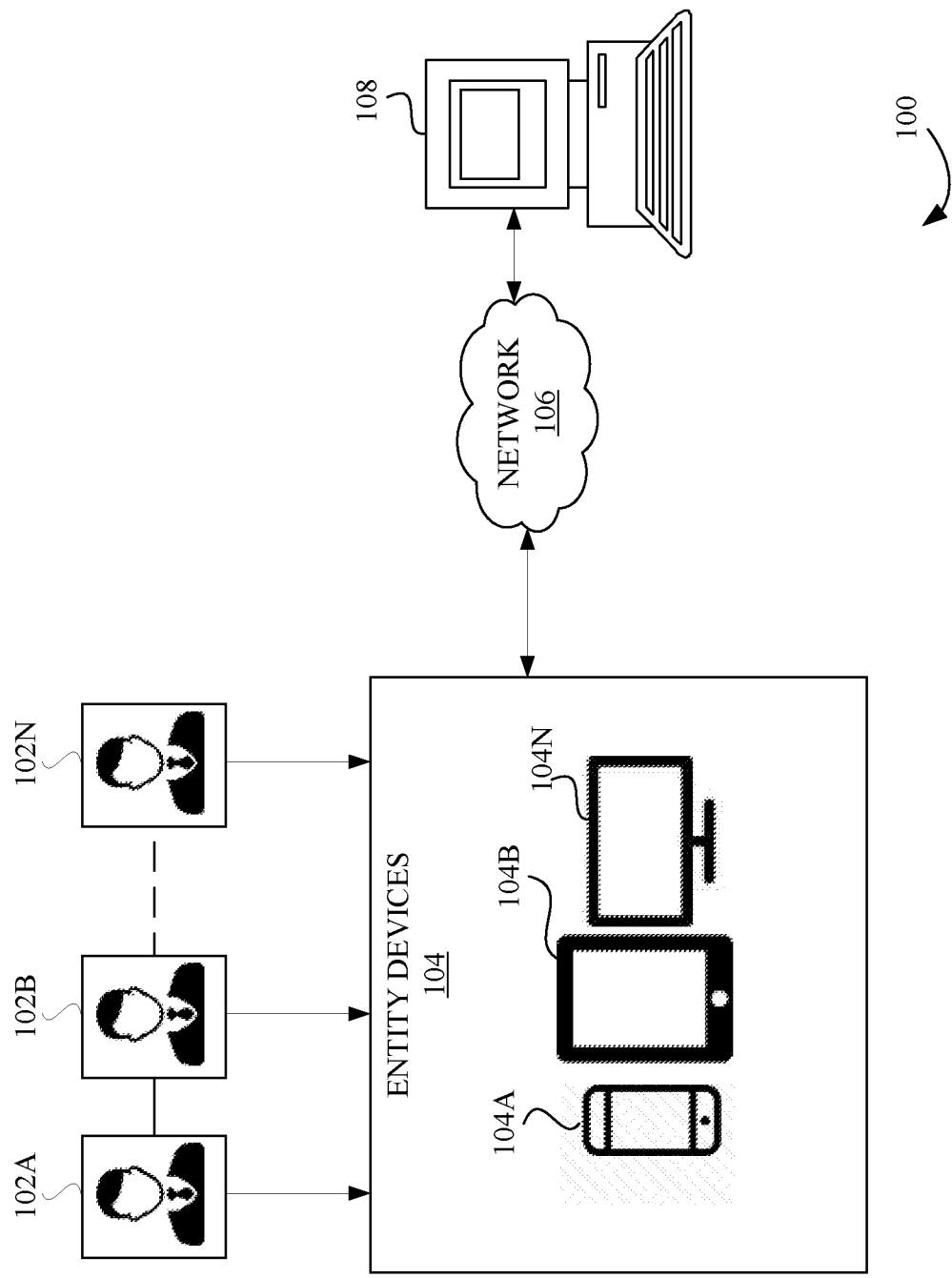
FIG. 1 is a schematic illustration of a system for identifying an entity device using a device signature of the entity device and a location signature of a location according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

There remains a need for a system and method for uniquely identifying a device, and more specifically to an automatic system and method for identifying the device using attributes and location signatures from the device. Referring now to the drawings, and more particularly to FIGS. 1 to 6, where similar reference characters denote corresponding features consistently throughout the figures, there are shown preferred embodiments.

The term "independently controlled data sources" refers to any source that may control or standardize different aspects of data streams. The different aspects include, but is not limited to, (1) a type of data that needs to be collected, (2) a time and location of the data needs to be collected, (3) a data collection method, (4) modification of collected data, (5) a portion of data to be revealed to public, (6) a portion of the data to be protected, (7) a portion of data that can be permitted by a consumer or a user of an application or the device, and (8) a portion of data to be completely private. The terms "consumer" and "user" may be used interchangeably and refer to an entity associated with a network device or an entity device.

A single real-world event may be tracked by different independently controlled data sources. Alternatively, data from the different independently controlled data sources may be interleaved to understand an event or a sequence of events. For example, consider the consumer using multiple applications on his smartphone, as he or she interacts with each application, multiple independent data streams of the sequence of events may be produced. Each application may become an independent data source. Events and users may have different identifiers across different applications depending on how the application is implemented. Additionally, if one were to monitor a network, each application-level event may generate additional lower-level network events.

In an exemplary embodiment, various modules described herein and illustrated in the figures are embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process computer logic instructions capable of providing at least one of digital signals or analog signals for performing various functions as described herein.

FIG. 1 is a schematic illustration of a system 100 for identifying an entity device 104A using a device signature of the entity device 104A and a location signature of a location according to some embodiments herein. The term "location" refers to a geographic location that includes a latitude-longitude pair and/or an altitude. The location may include a locality, a sub locality, an establishment, a geocode or an address. The location may be any geographic location on land or sea. The system 100 includes one or more entity devices 104A-N associated with one or more entities 102A-N, and a unique generated identifier server 108. The one or more entity devices 104A-N include one or more smart mobile applications. The one or more entity devices 104A-N is communicatively connected to the unique generated identifier server 108 through a network 106. In some embodiments, the one or more entities 102A-N are a set of individuals whose activity on the one or more entity devices 104A-N generate location data streams that may be used for identifying the entity device using the device signature of the entity device and the location signature of the location. The device signature may refer to a hashed identifier (a unique, non-sequential identifier) that may be generated using a plurality of device attributes. An example of the device signature may be "256353902131466809". The plurality of device attributes describes the entity device 104A and may be configured during the manufacturing process of the entity device 104A itself. The plurality of device attributes may include, but not be limited to, a make attribute, a model number attribute for a particular group of entity devices, an operating system, a device screen size and other suitable data related to the one or more entity devices 104A-N. For example, the plurality of device attributes may be (a) "Samsung, SM-A715F, Android, 1080×2400", (b) "Samsung|SM-N960U|Android", (c) "Apple|iPad|iOS". The set of individuals may be the consumer or the user. In some embodiments, the one or more entity devices 104A-N include, but are not limited to, a mobile device, a smartphone, a smart watch, a notebook, a Global Positioning System (GPS) device, a tablet, a desktop computer, a laptop or any network enabled device that generates the location data streams. In some embodiments, the one or more entity devices 104A-N may run the one or more smart mobile applications that are responsible to generate the location data streams. In some embodiments, the network 106 is at least one of a wired network, a wireless network, a combination of the wired network and the wireless network or the Internet. The unique generated identifier server 108 may be configured to generate at least one device signature for the one or more entity devices 104A-N based on the plurality of device attributes, one or more connection attributes and user agent strings obtained from independently controlled data sources. A connection attribute is a connection-indicative signal that may be generated at the one or more entity devices 104A-N. The connection attribute may be indicative of a presence or a characteristic of a connection between the one or more entity devices 104A-N and at least one other entity device of the one or more entity devices 104A-N or a server. The one or more connection attributes may include, but not be limited to, a connection type, an internet protocol address, and a carrier. For example, the one or more connection attributes may be "Cell4g,203.218.177.24,454-00". The user agent strings contain a number of tokens that refer to various aspects of a request from the one or more entity devices 104A-N to the server, including a browser name and a browser version, a rendering engine, the model number attribute of the one or more entity devices 104A-N, the operating system. For example, the user agent strings may be (a) "Mozilla/5.0 (Linux; Android 6.0; S9_N Build/MRA58K; wv)", (b) "AppleWebKit/537.36 (KHTML, like Gecko) Version/4.0", (c) "Chrome/84.0.4147.125" and (d) "Mobile Safari/537.36". Engagement of the one or more entity devices 104A-N with wi-fi hotspots may be tracked using location data streams that may be obtained from the different independently controlled data sources which may include telecom operators or smart mobile application data aggregators. The location data stream is the event or the sequence of events associated with time and location (longitude and latitude) and may also include additional payload information. The event or the sequence of events may be tracked by the different independently controlled data sources. For example, consider an entity 102A or a user using one or more smart mobile applications on an android phone associated with the entity 102A. As he or she interacts with each application, multiple independent streams of events may be produced and each application becomes an independent data source. Events and the one or more entity devices 104A-N may have different identifiers across different applications depending on how the smart mobile application is implemented. Additionally, if the network 106 were to be monitored, each smart mobile application-level event may generate additional lower-level network events.

The unique generated identifier server 108 may be configured to generate the at least one location signature for the location based on at least one of latitude-longitude pair and altitude, a shape or size of the location, and the one or more connection attributes of the one or more entity devices 104A-N that are connecting from the location. The shape or size of the location refers to a virtual boundary having a particular (and often predetermined) shape and size that defines the location. The unique generated identifier server 108 receives, a plurality of location data streams from the one or more entity devices 104A-N, where the plurality of location data streams comprises a timestamp data and at least one location attribute. The unique generated identifier server 108 generates a cohort of device signatures for the location. An example of the cohort of device signature may be "(4389236623442276359, 7329035296910515848, 3322724526607904070, −9072659017061832470)". The unique generated identifier server 108 generates an indexed data stream for the location using a combination of the at least one location signature and the cohort of device signatures for the location. The unique generated identifier server 108 builds at least one of a set of rules or a machine learning model based on the indexed data stream for the location. The unique generated identifier server 108 assigns a unique generated identifier for one of the one or more entity devices 104A-N based on at least one of the set of rules or the machine learning model. The unique generated identifier server 108 identifies, the one or more entity devices 104A-N from a selected data stream associated with the one or more entity devices 104A-N, where the selected data stream comprises a device information selected from the plurality of device attributes, the one or more connection attributes and the user agent strings, and a location information of the one or more entity devices 104A-N at a time, where the selected data stream does not include a device identifier of the one or more entity devices 104A-N. The location information may include the location, the latitude-longitude pair and/or the altitude A selected data stream may be a selection from the location data stream, the indexed data stream or a data stream obtained in real-time. The unique generated identifier server 108 may identify the one or more entity devices 104A-N from the selected data stream either in real-time or in a batch processing mode. Alternatively, data from the different independently controlled data sources may be interleaved to understand the event or the sequence of events that may enable a probabilistic assignment of the selected data stream to a home location of the one or more entity devices 104A-N.

Figure 2:
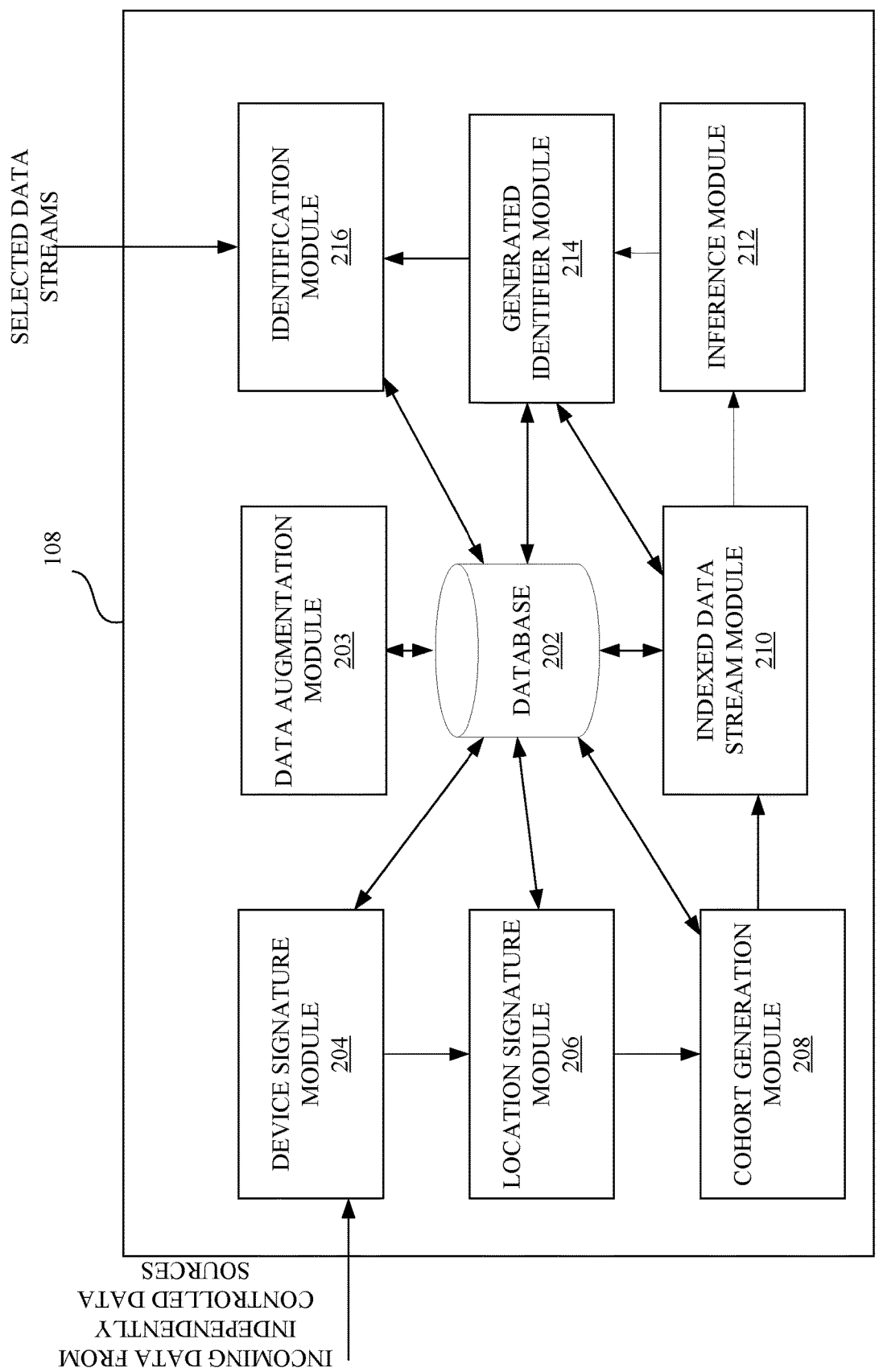
FIG. 2 is a block diagram of a unique generated identifier server of FIG. 1 according to some embodiments herein.

FIG. 2 is a block diagram of the unique generated identifier server 108 of FIG. 1 according to some embodiments herein. The unique generated identifier server 108 includes a database 202, a data augmentation module 203, a device signature module 204, a location signature module 206, a cohort generation module 208, an indexed data stream module 210, an inference module 212, a generated identifier module 214 and an identification module 216. The data augmentation module 203 receives data from the location data streams from the different independently controlled data sources and stores the data in the database 202. The device signature module 204 may be configured to generate the at least one device signature for the one or more entity devices 104A-N based on the plurality of device attributes, the one or more connection attributes and the user agent strings obtained from the different independently controlled data sources. The location signature module 206 may be configured to generate the at least one location signature for the location based on the at least one of latitude-longitude pair and altitude, the shape or size of the location, and the one or more connection attributes of the one or more entity devices 104A-N that are connecting from the location. The unique generated identifier server 108 receives, the plurality of location data streams from the one or more entity devices 104A-N, where the plurality of location data streams comprises the timestamp data and the at least one location attribute. To identify the one or more entity devices 104A-N in absence of a defined identifier received from the one or more entity devices 104A-N, a nearly stable or a slowly-changing mix of location data streams may be used. The cohort generation module 208 may be configured to generate the cohort of device signatures for the location. The indexed data stream module 210 may be configured to generate the indexed data stream for the location using the combination of the at least one location signature and the cohort of device signatures for the location. The indexed data stream may be a temporal data stream that may be sorted on an effective start time attribute. An index associated with the indexed data stream may enable processing of complex temporal pattern queries (such as multi-way joins) that may be qualified with snapshot operators (e.g. the 'as of' operator). An example of the indexed data stream may be "null|1440|33444511|4868650931|1604241782000|mopub|false|C0F1XXXX-CE1X-4BX4-9AC9-316XXX4XXXF|174.193.2.68|0|null|null|2020-11-01|14:43:00|null|-4057310896952601551|". The inference module 212 may be configured to build at least one of the set of rules or the machine learning model based on the indexed data stream for the location. In some embodiments, the set of rules or the machine learning model may include a regression model which is a form of predictive modelling technique that investigates a relationship between a dependent (target) and independent variable(s) (predictor). The set of rules may include, but not be limited to, a geo-hash rule, a location dimension rule. The geo-hash rule may be used to assign the unique generated identifier based on a geo-hash associated with the selected data stream. The location dimension rule may be used to assign the unique generated identifier based on the shape or size of the location associated with the selected data stream. In some embodiments, the one or more machine learning models may include, but not limited to, Random Forests, Prophet, DeepAR, LSTM/RNNs, Generative Adversarial Systems, Convolutional Neural Systems, Quantile Regressions, Bayesian Regressions, Factorization Machines, Bayesian Structural Time Series Models, Hidden Markov Models, and Monte Carlo Markov Chains. The generated identifier module 214 may be configured to assign the unique generated identifier for the entity device 104A of the one or more entity devices 104A-N based on the at least one of the set of rules or the machine learning model. The unique generated identifier may avoid duplication of activity or digital signals associated with the one or more entity devices 104A-N which may enable the unique generated identifier server 108 to correct one or more biases introduced by the location data streams. The identification module 216 may be configured to identify, the one or more entity devices 104A-N from the selected data stream associated with the one or more entity devices 104A-N, where the selected data stream comprises the device information selected from the plurality of device attributes, the one or more connection attributes and the user agent strings, and the location information of the one or more entity devices 104A-N at a time, where the selected data stream does not includes the device identifier of the one or more entity devices 104A-N. The identification module 216 may identify the one or more entity devices 104A-N from the selected data stream either in real-time or in a batch processing mode. Identifying the one or more entity devices 104A-N from the selected data stream may be performed by combining one or more dimensions associated with the one or more entity devices 104A-N including brand, model, internet protocol address, mac address, age, gender, affluence.

In some embodiments, the device information associated with the one or more entity devices 104A-N may be validated by correlating the device information with the openly available census information data.

In some embodiments, one or more large scale mobile advertising campaigns or brand awareness campaigns may be performed using one or more of the unique generated identifier. An advantage is that privacy of the one or more entity devices 104A-N is maintained as personally identifiable information may not be utilized for identifying the one or more entity devices 104A-N.

FIG. 3 is a schematic illustration 300 of the data augmentation module 203 of FIG. 2 for assigning a dynamic confidence score to the unique generated identifier according to some embodiments herein. The schematic illustration 300 includes the data augmentation module 203, the generated identifier module 214 and a generated identifier scoring module 302 that may be included in the unique generated identifier server 108. The data augmentation module receives data from independently controlled sources including (a) device attributes, connection attributes and user agent strings and further web data, smart mobile application data, sensor data and location data streams, (b) wi-fi data and (c) home location and work location data. The data augmentation module 203 may be configured to score each of the (a), (b) and (c) by assigning a weight to data associated with (a), (b) and (c). The data augmentation module 203 may be configured to assign a plurality of pre-computed weights the independently controlled data sources to increase accuracy of the unique generated identifier for the entity device 104A. The generated identifier scoring module 302 may be configured to assign a dynamic score of confidence to the unique generated identifier based on at least one of the set of rules or the machine learning model. The generated identifier scoring module 302 may be further configured to validate the dynamic score of confidence by correlating a plurality of attributes of the at least one device signature and at least one location signature with a historical labelled data set. An example output of the generated identifier scoring module is shown in the schematic illustration 300.

In some embodiments, the unique generated identifier server 108 may be configured to determine at least one attribute of the location by mapping a data stream associated with the location to the entity device. The at least one attribute of the location may include a visitor count, a dwell time, an open time, a close time, the frequency of visitors, a proximity of starting points of visitors, the location of the starting points of the visitors, a nature of the starting points of the visitors, the stay time at a different time of a day, the previous top locations and the next top locations and other similar places, or open spaces.

Figure 4:
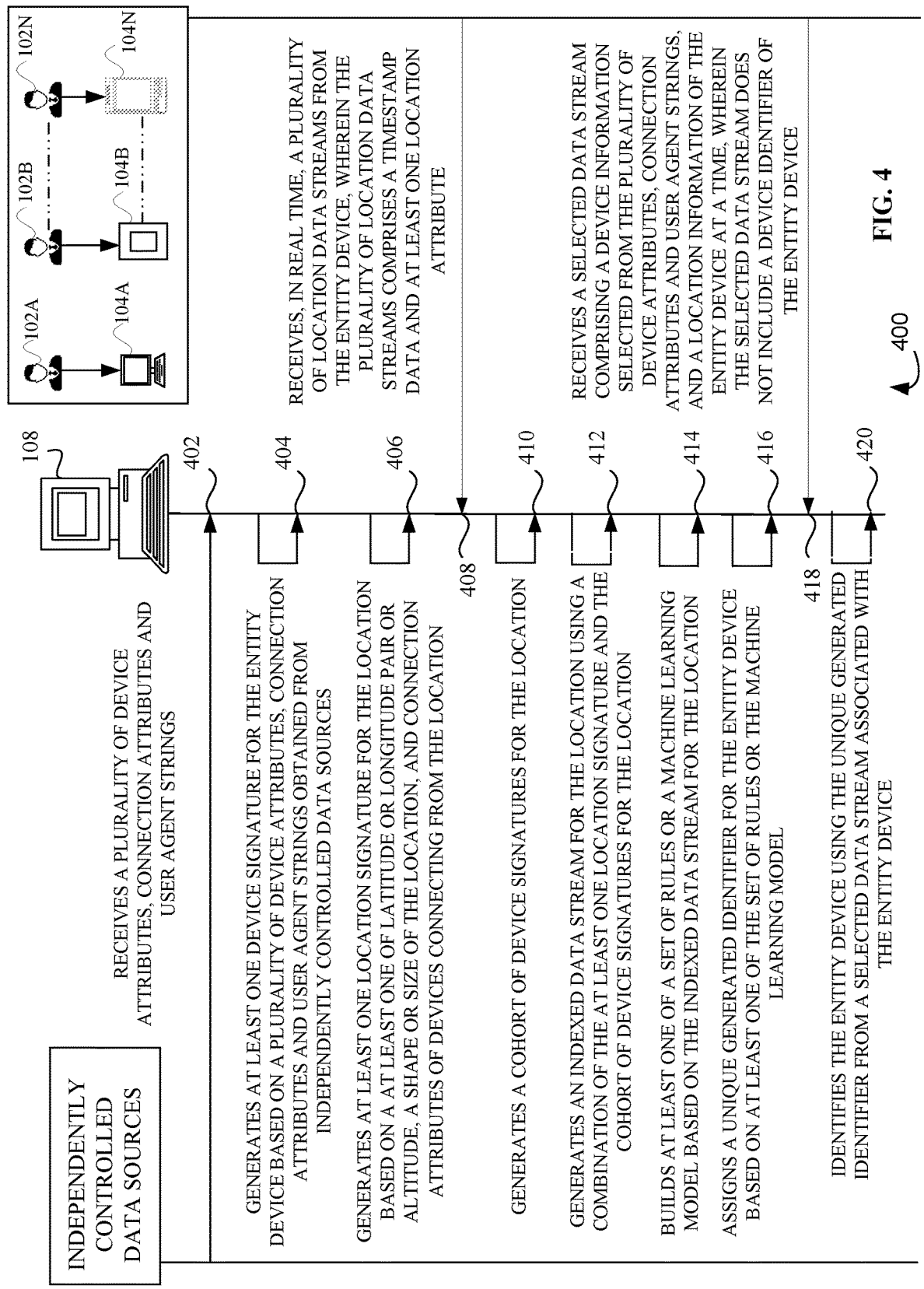
FIG. 4 illustrates an interaction diagram of a method for identifying the entity device using the device signature of the entity device and the location signature of the location according to some embodiments herein

FIG. 4 illustrates an interaction diagram 400 of a method for identifying the entity device using the device signature of the entity device and the location signature of the location according to some embodiments herein. At step 402, a plurality of device attributes, connection attributes and user agent strings are received. At step 404, at least one device signature for the entity device 104A-N based on a plurality of device attributes, connection attributes and user agent strings obtained from independently controlled data sources is generated. At step 406, at least one location signature for the location based on at least one of latitude-longitude pair and altitude, a shape or size of the location, and connection attributes of devices connecting from the location is generated. At step 408, a plurality of location data streams from the entity device 104A-N are received, wherein the plurality of location data streams comprises a timestamp data and at least one location attribute. At step 410, a cohort of device signatures for the location is generated. At step 412, an indexed data stream for the location is generated using a combination of the at least one location signature and the cohort of device signatures for the location. At step 414, at least one of a set of rules or a machine learning model is built based on the indexed data stream for the location. At step 416, a unique generated identifier for the entity device 104A-N is assigned based on at least one of the set of rules or the machine learning model. At step 418, a selected data stream comprising a device information selected from the plurality of device attributes, connection attributes and user agent strings, and a location information of the entity device at a time is received, wherein the selected data stream does not include a device identifier of the entity device. At step 420, the entity device 104A-N is identified, in real-time, using the unique generated identifier from a selected data stream associated with the entity device 104A-N.

In some embodiments, the location signature is determined from an annotated point of interest database. An example data set of the annotated point of interest database is describe as a table as follows.

| POI ID | Name | Address | Country | Phone Number | Open/Close Hours | Latitude | Longitude | Source | Primary Category | Insertion Batch ID | Created at | Updated at |
|---|---|---|---|---|---|---|---|---|---|---|---|---|
| 30-2982140 | Bernier-Friesen | 8450 Kensington Lane | Brazil | 769-856-8916 | 0900/2200 | −20.8938356 | −45.2721363 | Voonte | Baby | 161-04-2189 | 7:55:24 | 3:55:43 |
| 48-4724166 | Berge, Purdy and Schmeler | 232 Hermina Center | Philippines | 279-262-3039 | 1000/2100 | 7.3517838 | 122.2833466 | Flipbug | Shoes | 568-83-5059 | 5:30:45 | 10:57:05 |
| 87-8684334 | Hauck-Hirthe | 525 East Junction | Cape Verde | 863-886-5642 | 0900/2200 | 17.152756 | −25.027117 | Skimia | Movies | 677-05-5281 | 21:46:08 | 10:39:24 |
| 72-3980565 | Bernhard-Schultz | 82 Pine View Terrace | Nigeria | 555-970-3289 | 1000/2100 | 10.7119015 | 6.565661 | Bubbletube | Baby | 379-05-3631 | 17:11:11 | 9:05:38 |
| 23-7040833 | Hoppe, Schulist and Wilderman | 0 Eagan Junction | Indonesia | 185-117-2136 | 0900/2200 | −7.6377266 | 110.2722262 | Edgewire | Toys | 298-71-6981 | 21:54:21 | 2:34:13 |

| POI ID | Name | Address | Country | Phone Number | Open/Close Hours | Latitude | Longitude | Source | Primary Category | Insertion Batch ID | Created at | Updated at |
|---|---|---|---|---|---|---|---|---|---|---|---|---|
| 32-6934616 | Moen, Armstrong and Spinka | 4 Express Park | France | 858-606-6874 | 0900/2200 | 47.3036891 | 2.6981496 | Avamba | Grocery | 550-56-6836 | 20:44:00 | 18:39:21 |
| 11-3882497 | Hermiston Group | 57060 Del Sol Road | Russia | 683-385-9507 | 1000/2100 | 44.3264928 | 38.7015857 | Oyonder | Grocery | 569-49-5144 | 18:32:21 | 20:03:13 |
| 41-4833657 | Streich and Sons | 4706 Fisk Point | Japan | 252-753-3378 | 1000/2100 | 34.5646414 | 133.4167423 | Yakijo | Kids | 557-31-1693 | 7:55:29 | 8:51:47 |
| 12-2354668 | Turcotte, Pagac and McClure | 03745 Marquette Alley | Portugal | 938-339-1340 | 0900/2200 | 39.7715895 | −8.9263792 | Vimbo | Shoes | 259-60-8041 | 21:30:32 | 3:26:28 |
| 41-9908523 | Mitchell Inc | 77 Truax Way | Poland | 459-111-8629 | 0900/2200 | 51.3613799 | 20.7949705 | Devify | Health | 496-99-4193 | 5:31:00 | 7:50:29 |

POI ID refers to an identifier of a place of interest or the location.

Figure 5B:
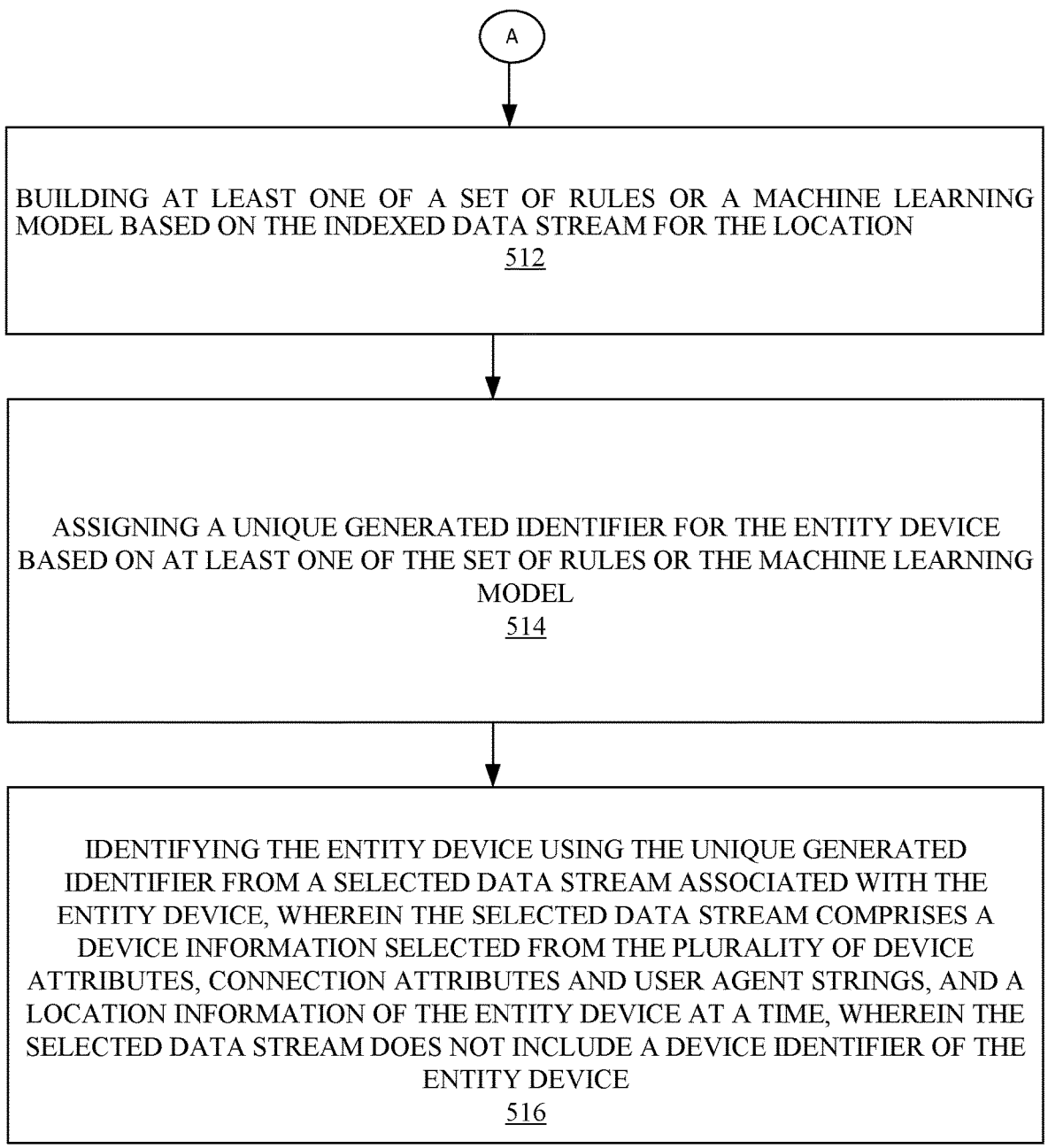

FIGS. 5A and 5B are flow diagrams of a method for identifying the entity device using a device signature of the entity device and a location signature of the location according to some embodiments herein. At step 502, the method includes generating at least one device signature for the entity device based on a plurality of device attributes, connection attributes and user agent strings obtained from independently controlled data sources. At step 504, the method includes generating at least one location signature for the location based on a at least one of latitude-longitude pair and altitude, a shape or size of the location, and connection attributes of devices connecting from the location. At step 506, the method includes receiving, a plurality of location data streams from the entity device. The plurality of location data streams comprises a timestamp data and at least one location attribute. At step 508, the method includes generating a cohort of device signatures for the location. At step 510, the method includes generating an indexed data stream for the location using a combination of the at least one location signature and the cohort of device signatures for the location. At step 512, the method includes building at least one of a set of rules or a machine learning model based on the indexed data stream for the location. At step 514, the method includes assigning a unique generated identifier for the entity device based on at least one of the set of rules or the machine learning model. At step 516, the method includes identifying, the entity device using the unique generated identifier from a selected data stream associated with the entity device, wherein the selected data stream comprises a device information selected from the plurality of device attributes, connection attributes and user agent strings, and a location information of the entity device at a time. The selected data stream does not include a device identifier of the entity device.

Figure 6:
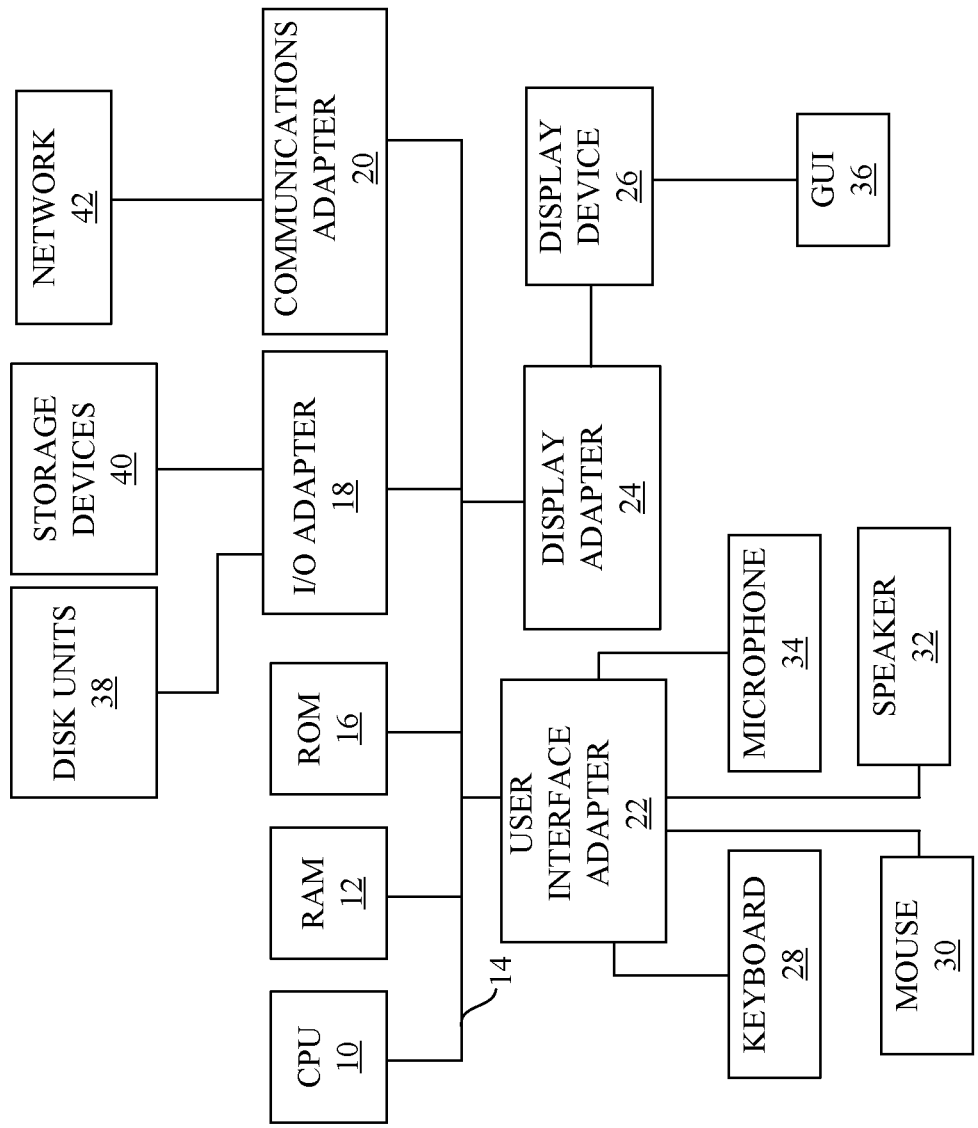
FIG. 6 is a schematic diagram of a computer architecture of the unique generated identifier server or one or more devices in accordance with embodiments herein.

A representative hardware environment for practicing the embodiments herein is depicted in FIG. 6, with reference to FIGS. 1 through 5B. This schematic drawing illustrates a hardware configuration of a server or a computer system or a computing device in accordance with the embodiments herein. The system includes at least one processing device CPU 10 that may be interconnected via system bus 14 to various devices such as a random-access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A method for identifying an entity device using a device signature of the entity device and a location signature of a location, where the location signature is based on a database, said method comprising:
   generating at least one device signature for the entity device based on a plurality of device attributes, connection attributes and user agent strings obtained from independently controlled data sources;
   generating at least one location signature for the location based on a at least one of latitude-longitude pair and altitude, a shape or size of the location, and connection attributes of devices connecting from the location;
   receiving, a plurality of location data streams from the entity device, wherein the plurality of location data streams comprises a timestamp data and at least one location attribute;
   generating a cohort of device signatures for the location;
   generating an indexed data stream for the location using a combination of the at least one location signature and the cohort of device signatures for the location;

building a machine learning model based on the indexed data stream for the location;
assigning a unique generated identifier for the entity device based on at least one of a set of rules or the machine learning model; and
identifying, the entity device using the unique generated identifier from a selected data stream associated with the entity device, wherein the selected data stream comprises a device information selected from the plurality of device attributes, connection attributes and user agent strings, and a location information of the entity device at a time, wherein the selected data stream does not include a device identifier of the entity device.

2. The method of claim 1, wherein the database comprises an annotated point of interest database, and the location signature is determined from the annotated point of interest database.

3. The method of claim 1, wherein a dynamic score of confidence is assigned to the unique generated identifier based on at least one of the set of rules or the machine learning model.

4. The method of claim 3, wherein the dynamic score of confidence is validated by correlating a plurality of attributes of the at least one device signature and at least one location signature with a historical labelled data set.

5. The method of claim 1, further comprising determining at least one attribute of the location by mapping a data stream associated with the location to the entity device.

6. The method of claim 1, wherein the method further comprises combining a plurality of attributes to identify the entity device, wherein the plurality of attributes comprises device attributes and attributes of a user associated with the entity device.

7. The method of claim 1, wherein a plurality of pre-computed weights is assigned to the independently controlled data sources to increase accuracy of the unique generated identifier for the entity device.

8. A unique generated identifier server that causes identifying an entity device using a device signature of the entity device and a location signature of a location, where the location signature is based on a database, said server comprising:
   a processor; and
   a memory that stores a set of instructions, which when executed by the processor, causes to perform:
      generating at least one device signature for the entity device based on a plurality of device attributes, connection attributes and user agent strings obtained from independently controlled data sources;
      generating at least one location signature for a location based on a at least one of latitude-longitude pair and altitude, a shape or size of the location, and connection attributes of devices connecting from the location;
      receiving, a plurality of location data streams from the entity device, wherein the plurality of location data streams comprises a timestamp data and at least one location attribute;
      generating a cohort of device signatures for the location;
      generating an indexed data stream for the location using a combination of the at least one location signature and the cohort of device signatures for the location;
      building a machine learning model based on the indexed data stream for the location;
      assigning a unique generated identifier for the entity device based on at least one of a set of rules or the machine learning model; and
      identifying, the entity device using the unique generated identifier from a selected data stream associated with the entity device, wherein the selected data stream comprises a device information selected from the plurality of device attributes, connection attributes and user agent strings, and a location information of the entity device at a time, wherein the selected data stream does not include a device identifier of the entity device.

9. The unique generated identifier server of claim 8, wherein the database comprises an annotated point of interest database, and the location signature is determined from the annotated point of interest database.

10. The unique generated identifier server of claim 8, wherein a dynamic score of confidence is assigned to the unique generated identifier based on at least one of the set of rules or the machine learning model.

11. The unique generated identifier server of claim 10, wherein the dynamic score of confidence is validated by correlating a plurality of attributes of the at least one device signature and at least one location signature with a historical labelled data set.

12. The unique generated identifier server of claim 8, wherein the unique generated identifier server determines at least one attribute of the location by mapping a data stream associated with the location to the entity device.

13. The unique generated identifier server of claim 8, wherein the unique generated identifier server combines a plurality of attributes to identify the entity device, wherein the plurality of attributes comprises device attributes and attributes of a user associated with the entity device.

14. The unique generated identifier server of claim 8, wherein a plurality of pre-computed weights is assigned to the independently controlled data sources to increase accuracy of the unique generated identifier.

15. A non-transitory computer readable storage medium storing a sequence of instructions, which when executed by a processor, causes identifying an entity device using a device signature of the entity device and a location signature of a location, where the location signature is based on a database, said sequence of instructions comprising:
   generating at least one device signature for the entity device based on a plurality of device attributes, connection attributes and user agent strings obtained from independently controlled data sources;
   generating at least one location signature for a location based on a at least one of latitude-longitude pair and altitude, a shape or size of the location, and connection attributes of devices connecting from the location;
   receiving, a plurality of location data streams from the entity device, wherein the plurality of location data streams comprises a timestamp data and at least one location attribute;
   generating a cohort of device signatures for the location;
   generating an indexed data stream for the location using a combination of the at least one location signature and the cohort of device signatures for the location;
   building a machine learning model based on the indexed data stream for the location;
   assigning a unique generated identifier for the entity device based on at least one of a set of rules or the machine learning model; and
   identifying, the entity device using the unique generated identifier from a selected data stream associated with the entity device, wherein the selected data stream comprises a device information selected from the plurality of device attributes, connection attributes and user agent strings, and a location information of the entity device at a time, wherein the selected data stream does not include a device identifier of the entity device.

16. The non-transitory computer readable storage medium storing a sequence of instructions of claim 15, wherein the database comprises an annotated point of interest database, and the location signature is determined from the annotated point of interest database.

17. The non-transitory computer readable storage medium storing a sequence of instructions of claim 15, wherein a dynamic score of confidence is assigned to the unique generated identifier based on at least one of the set of rules or the machine learning model.

18. The non-transitory computer readable storage medium storing a sequence of instructions of claim 17, wherein the dynamic score of confidence is validated by correlating a plurality of attributes of the at least one device signature and at least one location signature with a historical labelled data set.

19. The non-transitory computer readable storage medium storing a sequence of instructions of claim 15, which when executed by the said process, further combines a plurality of attributes to identify the entity device, wherein the plurality of attributes comprises device attributes and attributes of a user associated with the entity device.

20. The non-transitory computer readable storage medium storing a sequence of instructions of claim 15, wherein a plurality of pre-computed weights is assigned to the independently controlled data sources to increase accuracy of the unique generated data stream that does not include device identifier of the entity device.

* * * * *